United States Patent [19]

Kirkpatrick

[11] Patent Number: 4,579,362
[45] Date of Patent: Apr. 1, 1986

[54] LATERALLY YIELDABLE HITCH POLE FOR TRAILING VEHICLES

[75] Inventor: Kenneth L. Kirkpatrick, Welland, Canada

[73] Assignee: Deere & Company, Moline, Ill.

[21] Appl. No.: 607,034

[22] Filed: May 4, 1984

[51] Int. Cl.⁴ .............................................. B62D 13/02
[52] U.S. Cl. ...................................... 280/444; 172/267; 172/678; 280/447; 280/449; 280/486
[58] Field of Search ........... 280/447, 448, 449, 446 R, 280/457, 482, 483, 484, 494, 486; 172/202, 203, 201, 678, 267, 7, 667; 111/86; 403/111, 145, 160

[56] References Cited

U.S. PATENT DOCUMENTS

| | | | |
|---|---|---|---|
| 2,923,364 | 2/1960 | King | 280/489 |
| 3,012,638 | 12/1961 | Morlik | 280/444 |
| 3,340,936 | 9/1967 | Godbersen | 280/488 |
| 3,490,544 | 1/1970 | Godbersen | 172/202 |
| 3,523,584 | 8/1970 | Godbersen | 172/203 |

Primary Examiner—John A. Pekar
Assistant Examiner—Everett G. Diederiks, Jr.
Attorney, Agent, or Firm—Henderson & Sturm

[57] ABSTRACT

A laterally yieldable or "bendable" hitch pole is provided for the steering mechanism of a trailing vehicle to minimize or prevent breakage of the hitch pole during sharp turns negotiated by the draft vehicle, especially during backing of the trailer. The invention is especially applicable to trailers having steering mechanisms of the Ackerman type. The hitch pole is typically swingable between right and left stops and breakage or other damage occurs when the pole encounters one or the other of the stops and turning forces are still applied. The invention provides a two-piece hitch pole having its end-to-end parts connected in such manner as to enable "bending" of the hitch pole in those situations with subsequent recovery of the pole to its normal attitude.

4 Claims, 5 Drawing Figures

LATERALLY YIELDABLE HITCH POLE FOR TRAILING VEHICLES

BACKGROUND AND SUMMARY

A typical trailing vehicle, such as four-wheeled trailer or wagon, is equipped with Ackerman steering for its steerable front wheels and the tie-rod for these wheels is connected to a hitch pole by means of which the trailer is towed by a draft vehicle. Conventionally, the steering of the front wheels is limited by right and left stops and, if excessive lateral forces are imposed on the hitch pole after either stop is engaged, serious damage, such as bending or breakage of the pole can result. Situations of this this character occur more frequently in backing of the trailer, because it is in that area that control of the draft and trailing vehicles is somewhat more difficult than in straight-ahead operation.

According to the present invention, the hitch pole is made up of front and rear parts normally disposed in end-to-end relationship for normal pushing and pulling operations as well as for steering and the like within limits in which the steering stops are not encountered with forces likely to be detrimental to the hitch pole and/or its related parts. The hitch pole parts are yieldably held together in normal end-to-end relationship by a spring-loaded device of sufficient loading to maintain the hitch parts operative for towing and backing operations not involving overloading. During excessive steering, which involves excessive lateral swinging of the hitch pole about its vertical pivot to the trailer frame or chassis, one of the stops will be engaged by the rear part, and the spring-loaded device will yield to enable continued lateral swinging of the front hitch pole part without imposing undue forces on the now stopped rear hitch pole part.

It is a feature of the invention to provide the terminal, meeting ends of the hitch pole parts with a junction comprising face-to-face abutting plates disposed transversely and upright as respects the fore-and-aft centerline of the hitch pole considered as a unit. A spring-loaded device normally keeps the plates in face-to-face relationship but this device is yieldable in response to predetermined forces to enable one plate to rock on the other about an upright fulcrum. The relationship between the plates and spring-loaded device is such that right and left fulcra are provided to accommodate lateral swinging and "bending" of the pole at one or the other of the fulcra, depending upon the direction of lateral over-swinging of the pole. The spring-loaded device is calculated to prevent excessive separation of the plates during straight-ahead operation; although, the device can function as a cushion in the event of the occurrence of excessive draft forces.

Further features and objects will appear as a preferred embodiment of the invention is disclosed hereafter.

DESCRIPTION OF A PREFERRED EMBODIMENT

Figure 1:
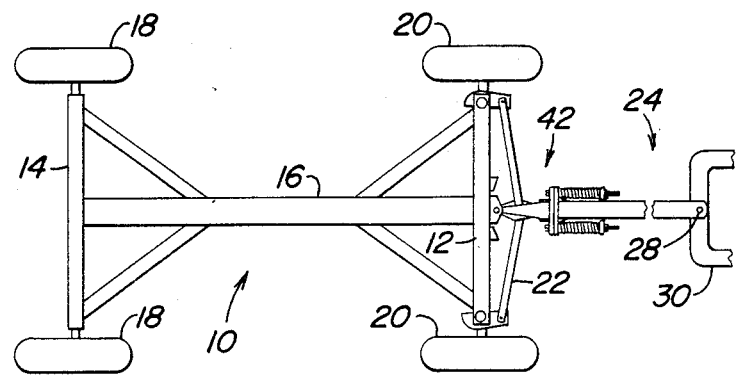
FIG. 1 is a small-scale plan of a typical trailer equipped with a preferred form of the invention.
Figure 2:
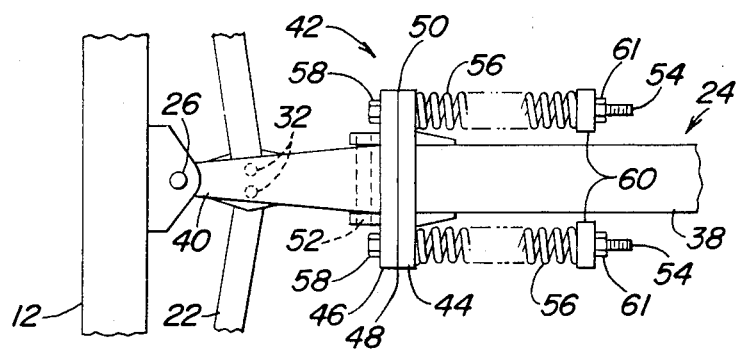
FIG. 2 is an enlarged, fragmentary plan showing the invention in greater detail.
Figure 3:
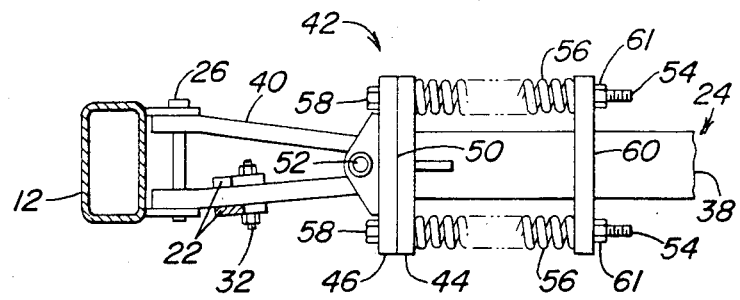
FIG. 3 is an elevation of the structure shown in FIG. 2.

The numeral (10) designates a typical trailing vehicle frame of the type having front and rear bolsters (12) and (14), respectively, a fore-and-aft reach (16), rear wheels (18) and steerable front wheels (20) cross-connected by a tie rod (22) as in the usual Ackerman steering system. A longitudinal hitch pole (24) is pivoted at its bifurcated rear end to the front bolster by a vertical pin (26) and at is front end has a clevis (28) for connection to a draft vehicle, the numeral (30) indicating the drawbar of a tractor, for example. Considering (for the moment) that hitch pole is typically continuous, it functions to steer the front wheels via a vertical pivotal connection (32) to the tie rod, here ahead of the pivot (26) (FIG. 2). Steering to the right and left is limited, as by conventional right and left stops (34) and (36), respectively. At this point, it will be seen that attempted over-steering after a stop is encountered imposes a lateral bending force on the hitch pole, which can result in serious damage to the hitch pole and/or related parts.

The present invention eliminates the possibility of such damage by constructing the hitch pole of front and rear hitch pole parts (38) and (40) respectively, the rear part having the pivotal connection (26) to the front bolster (12) and the front part having the clevis (28). These parts are disposed in end-to-end relation and are joined by interconnecting means (42), here made up of front and rear members in the form of plates (44) and (46) respectively. Each plate is preferably rectangular and they normally lie flatwise or in face-to-face abutting relationship to each other. The plates are also congruent and thus they have opposite upright edge portions normally meeting at (48) and (50), (FIG. 2). The rear plate is preferably welded to a pair of laterally spaced apart ears which receive a transverse "queen pin" (52) which permits vertical swinging of the front hitch pole part and the interconnecting means relative to the rear hitch pole part, as when the trailer travels over uneven terrain. A cross pivot such as that at (52) is commonly found in like vehicles and such is not part of the present invention.

Figures 4, 5:
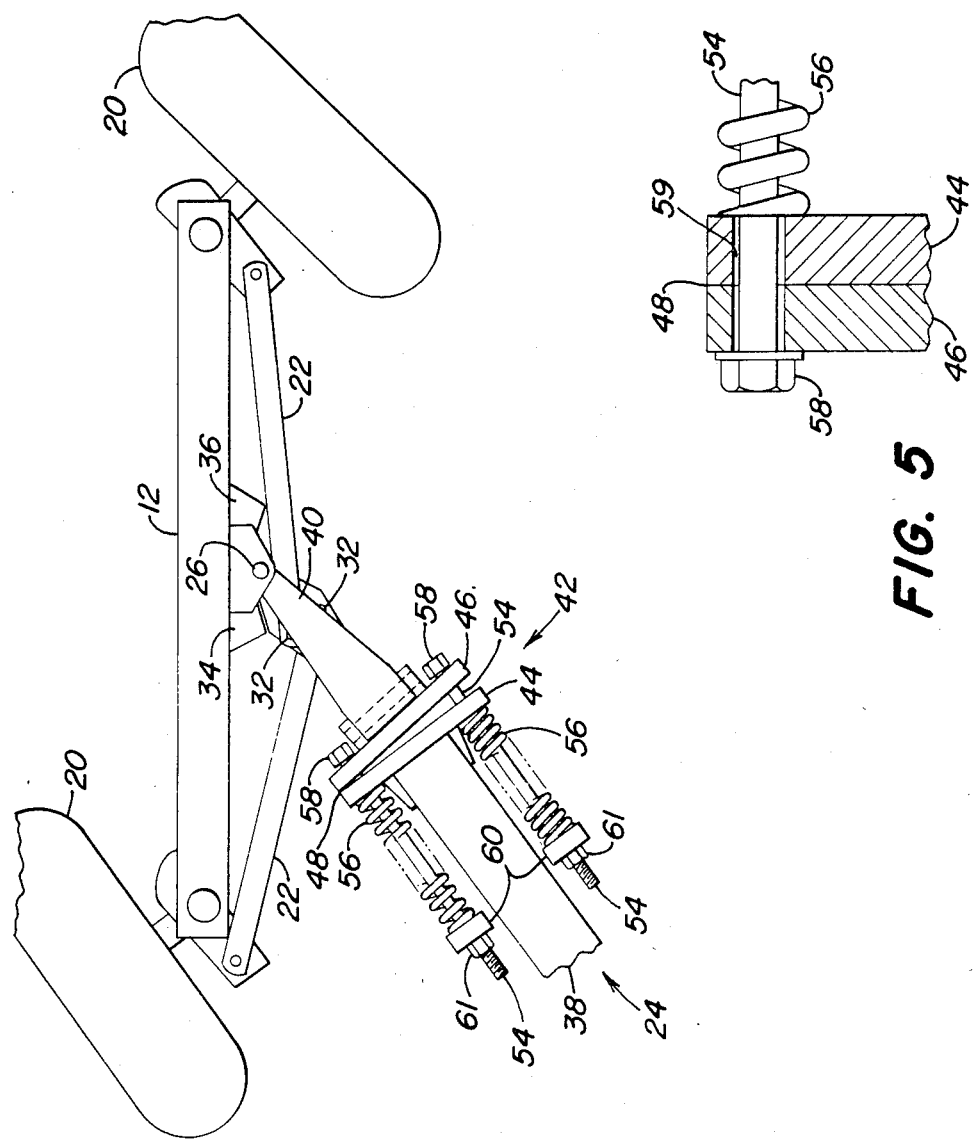
FIG. 4 is a fragmentary plan, enlarged over the scale of FIG. 1, and showing the hitch pole in an over-steered condition to the right.
FIG. 5 is an enlarged, sectional view of a portion of the spring-loaded connection between the front and rear hitch pole plates.

The interconnecting means (42) includes a spring-loaded device made up here of a plurality of fore-and-aft bolts or rods (54), each encircled by a coiled spring (56). Each bolt passes rather loosely through alined bores (59) in the plates (FIG. 5). Each bolt has a headed end (58) that abuts the rear plate and the respective spring (56) encircles the bolt between the front of the front plate and a vertical tie strap (60) that has upper and lower apertures (not shown) for receiving the upper and lower bolts, respectively. For each bolt, a nut (61) is threaded thereon and abuts a tie strap (60) from the front. The tie strap serves to keep the springs in general parallelism. It is understood that a similar construction exists at the opposite side of the means (42).

FIG. 4 illustrates a condition in which the front wheels are turned to the right until the rear hitch pole part engages the right stop (36) but lateral force to the right on the hitch pole continues. The plates fulcrum relative to each other about the upright fulcrum afforded by the right-hand meeting edges of the plates at (48). The right-hand spring unit retains the plates in fulcruming relation and the right-hand spring is compressed as the front hitch pole part continues rightward. The necessary movement is permitted by the relative sizes of the bolts and plate bores. Thus the plates rock relative to each other and over-steering is accommodated by the spring-loaded interconnecting means (42). The plates will function to the left in like fashion, using the left-hand fulcrum established by the meeting edge portions of the plates at (50). It is expected that when the permitted "bending" of the hitch pole occurs, the vehicle operator will recognize the condition and discontinue the application of further lateral swinging of the hitch.

Although the preferred construction uses four spring sets, more or fewer may be employed. Such modifications will depend upon the overall vehicle loading requirements, sizes, etc. The present arrangement is not only economical and functional but it may be readily adapted to existing trailers. Features and advantages not specifically pointed out will be apparent to those versed in the art, as will many modifications and alterations in the preferred embodiment, all of which may be made without departure from the spirit and scope of the invention.

I claim:

1. Steering mechanism for a trailer vehicle having a fore-and-aft frame carried on rear wheels and a pair of steerable front wheels interconnected by a tie rod means shiftable laterally in response to lateral swinging of a hitch pole pivoted to the frame at its rear end on a vertical axis and connected to the tie rod means, and right and left stops limiting right and left swinging, respectively of the hitch pole, characterized in that the hitch pole comprises separate front and rear parts disposed normally in end-to-end relationship on a fore-and-aft substantially horizontal centerline, the rear part being connected to the frame on the aforesaid vertical axis and connected to the tie rod means for swinging as aforesaid, said rear part having a terminal front end and said front part having a terminal rear end and means interconnecting said terminal ends ahead of the tie rod means to provide a junction enabling the transmission of pushing and pulling forces between the parts and also for lateral swinging of the parts in unison between the stops, said interconnecting means including a pair of face-to-face abutting transverse upright plates, one rigid with each terminal end, each plate having opposite, upright right and left straight edge portions normally respectively engaging with each other, said interconnecting means further including a spring-loaded device interconnecting the plates normally in said face-to-face abutting relationship, said device yielding when the rear part engages either of said stops to enable lateral overswinging of the front hitch part at said junction, the respective engaging edges of the plates providing fulcra for rocking of the plates relative to each other, during overswinging of the front part, said device being operative to effect return of the hitch pole parts in normal end-to-end relationship.

2. Steering mechanism according to claim 1, further characterized in that the spring-loaded device includes right and left springs respectively at right and left sides of the hitch pole centerline.

3. Steering mechanism according to claim 1, further characterized in that the plates are congruent with each other.

4. Steering mechanism according to claim 1, further characterized in that the spring-loaded device includes right and left pairs of springs respectively at the right and left sides of the hitch pole centerline, the springs of each pair also lying respectively above and below the level of said centerline.

* * * * *